(12) United States Patent
Delgado

(10) Patent No.: US 10,167,702 B2
(45) Date of Patent: Jan. 1, 2019

(54) ELECTRICAL POWER GENERATION SYSTEM

(71) Applicant: Schlumberger Technology Corporation, Sugar land, TX (US)

(72) Inventor: Miguel Marcel Jose Delgado, Bristol (GB)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 213 days.

(21) Appl. No.: 14/807,833

(22) Filed: Jul. 23, 2015

(65) Prior Publication Data

US 2016/0053589 A1 Feb. 25, 2016

Related U.S. Application Data

(60) Provisional application No. 62/039,851, filed on Aug. 20, 2014.

(51) Int. Cl.
*E21B 4/04* (2006.01)
*H02K 49/10* (2006.01)
*H02K 7/18* (2006.01)
*E21B 41/00* (2006.01)
*H02P 9/00* (2006.01)

(52) U.S. Cl.
CPC ....... *E21B 41/0085* (2013.01); *H02K 49/106* (2013.01); *H02P 9/008* (2013.01); *H02K 7/1823* (2013.01)

(58) Field of Classification Search
CPC ..... E21B 4/04; E21B 41/0085; H02K 49/106; H02K 7/1823; H02B 9/008
See application file for complete search history.

(56) References Cited

U.S. PATENT DOCUMENTS

| 4,732,225 A * | 3/1988 | Jurgens | E21B 4/00 166/66.5 |
| 5,204,572 A * | 4/1993 | Ferreira | H02K 49/106 310/156.19 |
| 2004/0085223 A1* | 5/2004 | Winnacker | E21B 41/0085 340/853.1 |
| 2006/0132100 A1* | 6/2006 | Tsubone | B60L 1/00 320/150 |
| 2008/0047753 A1* | 2/2008 | Hall | E21B 41/0085 175/57 |
| 2008/0142264 A1* | 6/2008 | Hall | E21B 4/006 175/45 |
| 2013/0228373 A1* | 9/2013 | Scholz | E21B 4/04 175/24 |

FOREIGN PATENT DOCUMENTS

WO WO2014/178886 A1 * 11/2014 ............. E21B 41/00

* cited by examiner

*Primary Examiner* — Cathleen R Hutchins

(57) ABSTRACT

Aspects of the disclosure can relate to a system including a rotatable input shaft and an output shaft to be rotationally driven by the input shaft. The system can also include a coupling that couples the input shaft to the output shaft. The coupling can transmit a predefined torque before slipping. The system can further include an electrical generator coupled with the output shaft. The electrical generator can be electrically connected to a primary electrical load and a secondary electrical load, where the secondary electrical load is adjustable to maintain the torque transmitted by the coupling approximately at the predefined torque after the coupling slips.

20 Claims, 3 Drawing Sheets

ELECTRICAL POWER GENERATION SYSTEM

CROSS REFERENCE TO RELATED APPLICATIONS

This is a non-provisional patent application of co-pending U.S. provisional patent application Ser. No. 62/039,851, to Miguel Marcel Jose Delgado, filed on filing on Aug. 20, 2014, and entitled "Electrical Power Generation Systems," which is hereby incorporated in its entirety for all intents and purposes by this reference.

BACKGROUND

Oil wells are created by drilling a hole into the earth using a drilling rig that rotates a drill string (e.g., drill pipe) having a drill bit attached thereto. The drill bit, aided by the weight of pipes (e.g., drill collars) cuts into rock within the earth. Drilling fluid (e.g., mud) is pumped into the drill pipe and exits at the drill bit. The drilling fluid may be used to cool the bit, lift rock cuttings to the surface, at least partially prevent destabilization of the rock in the wellbore, and/or at least partially overcome the pressure of fluids inside the rock so that the fluids do not enter the wellbore. Other equipment can also be used for evaluating formations, fluids, production, other operations, and so forth.

Downhole equipment can be powered by remote energy sources that power the equipment via transmission lines (e.g., electrical, optical, mechanical, or hydraulic transmission lines). Downhole equipment can also be powered by local energy sources such as local generators (e.g., mud turbines) or energy storage devices (e.g., battery packs) coupled with the equipment.

SUMMARY

Aspects of the disclosure can relate to an electrical power generation system. In embodiments, the system can include a rotatable input shaft and an output shaft to be rotationally driven by the input shaft. The system can also include a coupling that couples the input shaft to the output shaft. The coupling can transmit a predefined torque before slipping. The system can further include an electrical generator coupled with the output shaft. The electrical generator can be electrically connected to a primary electrical load and a secondary electrical load, where the secondary electrical load is adjustable to maintain the torque transmitted by the coupling approximately at the predefined torque after the coupling slips.

This summary is provided to introduce a selection of concepts that are further described below in the detailed description. This summary is not intended to identify key or essential features of the claimed subject matter, nor is it intended to be used as an aid in limiting the scope of the claimed subject matter.

FIGURES

Embodiments of an electrical power generation system are described with reference to the following figures. The same numbers are used throughout the figures to reference like features and components.

DETAILED DESCRIPTION

Figure 1:
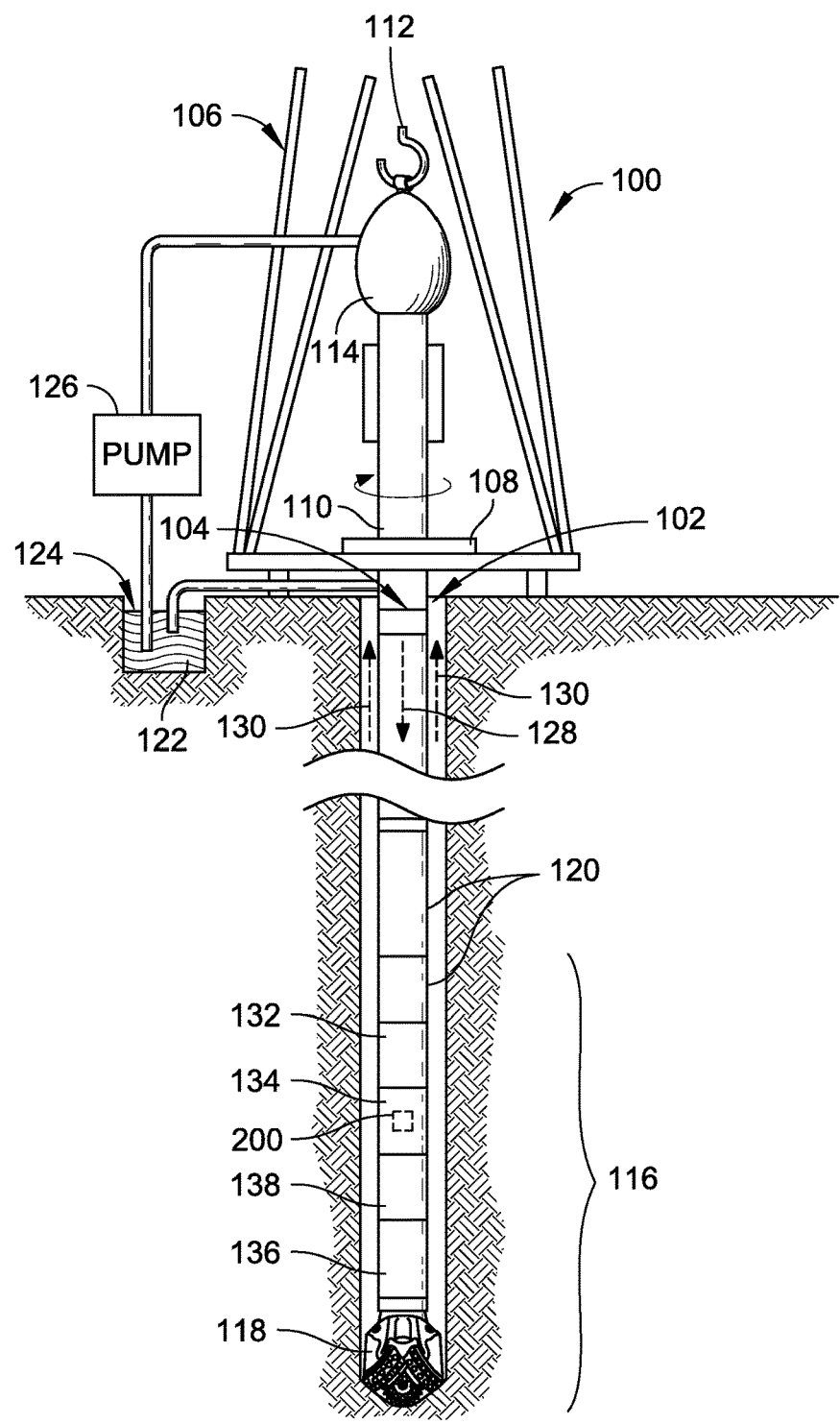
FIG. 1 illustrates an example system in which embodiments of an electrical power generation system can be implemented.

FIG. 1 depicts a wellsite system 100 in accordance with one or more embodiments of the present disclosure. The wellsite can be onshore or offshore. A borehole 102 is formed in subsurface formations by directional drilling. A drill string 104 extends from a drill rig 106 and is suspended within the borehole 102. In some embodiments, the wellsite system 100 implements directional drilling using a rotary steerable system (RSS). For instance, the drill string 104 is rotated from the surface, and down hole devices move the end of the drill string 104 in a desired direction. The drill rig 106 includes a platform and derrick assembly positioned over the borehole 102. In some embodiments, the drill rig 106 includes a rotary table 108, kelly 110, hook 112, rotary swivel 114, and so forth. For example, the drill string 104 is rotated by the rotary table 108, which engages the kelly 110 at the upper end of the drill string 104. The drill string 104 is suspended from the hook 112 using the rotary swivel 114, which permits rotation of the drill string 104 relative to the hook 112. However, this configuration is provided by way of example and is not meant to limit the present disclosure. For instance, in other embodiments a top drive system is used.

A bottom hole assembly (BHA) 116 is suspended at the end of the drill string 104. The bottom hole assembly 116 includes a drill bit 118 at its lower end. In embodiments of the disclosure, the drill string 104 includes a number of drill pipes 120 that extend the bottom hole assembly 116 and the drill bit 118 into subterranean formations. Drilling fluid (e.g., mud) 122 is stored in a tank and/or a pit 124 formed at the wellsite. The drilling fluid can be water-based, oil-based, and so on. A pump 126 displaces the drilling fluid 122 to an interior passage of the drill string 104 via, for example, a port in the rotary swivel 114, causing the drilling fluid 122 to flow downwardly through the drill string 104 as indicated by directional arrow 128. The drilling fluid 122 exits the drill string 104 via ports (e.g., courses, nozzles) in the drill bit 118, and then circulates upwardly through the annulus region between the outside of the drill string 104 and the wall of the borehole 102, as indicated by directional arrows 130. In this manner, the drilling fluid 122 cools and lubricates the drill bit 118 and carries drill cuttings generated by the drill bit 118 up to the surface (e.g., as the drilling fluid 122 is returned to the pit 124 for recirculation).

In some embodiments, the bottom hole assembly 116 includes a logging-while-drilling (LWD) module 132, a measuring-while-drilling (MWD) module 134, a rotary steerable system 136, a motor, and so forth (e.g., in addition to the drill bit 118). The logging-while-drilling module 132 can be housed in a drill collar and can contain one or a number of logging tools. It should also be noted that more than one LWD module and/or MWD module can be employed (e.g. as represented by another logging-while-drilling module 138). In embodiments of the disclosure, the logging-while drilling modules 132 and/or 138 include capabilities for measuring, processing, and storing information, as well as for communicating with surface equipment, and so forth.

The measuring-while-drilling module 134 can also be housed in a drill collar, and can contain one or more devices for measuring characteristics of the drill string 104 and drill bit 118. The measuring-while-drilling module 134 can also include components forming all or part of a system 200 for generating electrical power for down hole equipment (e.g., sensors, electrical motors, transmitters, receivers, controllers, energy storage devices, and so forth). For example, the system 200 can include a mud turbine generator (also referred to as a "mud motor") powered by the flow of the drilling fluid 122. It is noted that the electrical power generation system 200 can also be located at a location along the drill string 104 that is not within or proximate to the measuring-while-drilling module 134. Other power and/or battery systems can also be employed. The measuring-while-drilling module 134 can include one or more of the following measuring devices: a weight-on-bit measuring device, a torque measuring device, a vibration measuring device, a shock measuring device, a stick slip measuring device, a direction measuring device, an inclination measuring device, and so on.

In embodiments of the disclosure, the wellsite system 100 is used with controlled steering or directional drilling. For example, the rotary steerable system 136 is used for directional drilling. As used herein, the term "directional drilling" describes intentional deviation of the wellbore from the path it would naturally take. Thus, directional drilling refers to steering the drill string 104 so that it travels in a desired direction. In some embodiments, directional drilling is used for offshore drilling (e.g., where multiple wells are drilled from a single platform). In other embodiments, directional drilling enables horizontal drilling through a reservoir, which enables a longer length of the wellbore to traverse the reservoir, increasing the production rate from the well. Further, directional drilling may be used in vertical drilling operations. For example, the drill bit 118 may veer off of a planned drilling trajectory because of the unpredictable nature of the formations being penetrated or the varying forces that the drill bit 118 experiences. When such deviation occurs, the wellsite system 100 may be used to guide the drill bit 118 back on course.

Drill assemblies can be used with, for example, a wellsite system (e.g., the wellsite system 100 described with reference to FIG. 1). For instance, a drill assembly can comprise a bottom hole assembly suspended at the end of a drill string (e.g., in the manner of the bottom hole assembly 116 suspended from the drill string 104 depicted in FIG. 1). In some embodiments, a drill assembly is implemented using a drill bit. However, this configuration is provided by way of example and is not meant to limit the present disclosure. In other embodiments, different working implement configurations are used. Further, use of drill assemblies in accordance with the present disclosure is not limited to wellsite systems described herein. Drill assemblies can be used in other various cutting and/or crushing applications, including earth boring applications employing rock scraping, crushing, cutting, and so forth.

A drill assembly includes a body for receiving a flow of drilling fluid. The body comprises one or more crushing and/or cutting implements, such as conical cutters and/or bit cones having spiked teeth (e.g., in the manner of a roller-cone bit). In this configuration, as the drill string is rotated, the bit cones roll along the bottom of the borehole in a circular motion. As they roll, new teeth come in contact with the bottom of the borehole, crushing the rock immediately below and around the bit tooth. As the cone continues to roll, the tooth then lifts off the bottom of the hole and a high-velocity drilling fluid jet strikes the crushed rock chips to remove them from the bottom of the borehole and up the annulus. As this occurs, another tooth makes contact with the bottom of the borehole and creates new rock chips. In this manner, the process of chipping the rock and removing the small rock chips with the fluid jets is continuous. The teeth intermesh on the cones, which helps clean the cones and enables larger teeth to be used. A drill assembly comprising a conical cutter can be implemented as a steel milled-tooth bit, a carbide insert bit, and so forth. However, roller-cone bits are provided by way of example and are not meant to limit the present disclosure. In other embodiments, a drill assembly is arranged differently. For example, the body of the bit comprises one or more polycrystalline diamond compact (PDC) cutters that shear rock with a continuous scraping motion.

In embodiments of the disclosure, the body of a drill assembly can define one or more nozzles that allow the drilling fluid to exit the body (e.g., proximate to the crushing and/or cutting implements). The nozzles allow drilling fluid pumped through, for example, a drill string to exit the body. For example, drilling fluid can be furnished to an interior passage of the drill string by the pump and flow downwardly through the drill string to a drill bit of the bottom hole assembly, which can be implemented using, for example, a drill assembly. Drilling fluid then exits the drill string via nozzles in the drill bit, and circulates upwardly through the annulus region between the outside of the drill string and the wall of the borehole. In this manner, rock cuttings can be lifted to the surface, destabilization of rock in the wellbore can be at least partially prevented, the pressure of fluids inside the rock can be at least partially overcome so that the fluids do not enter the wellbore, and so forth.

As discussed above, the body of a drill assembly can house components that form a system 200 for generating electrical power for the down hole equipment. Generators typically output electrical power that is directly linked to a rotational speed of a generator rotor (e.g., rotational speed of a turbine impeller). As such, it can be difficult to maintain an output voltage within an acceptable range. Complex control systems (e.g., hybrid homopolar alternators) can be used to output a regulated output voltage but it has been found that such solutions result in mechanical tradeoffs, such as limited flow range.

Figure 2:
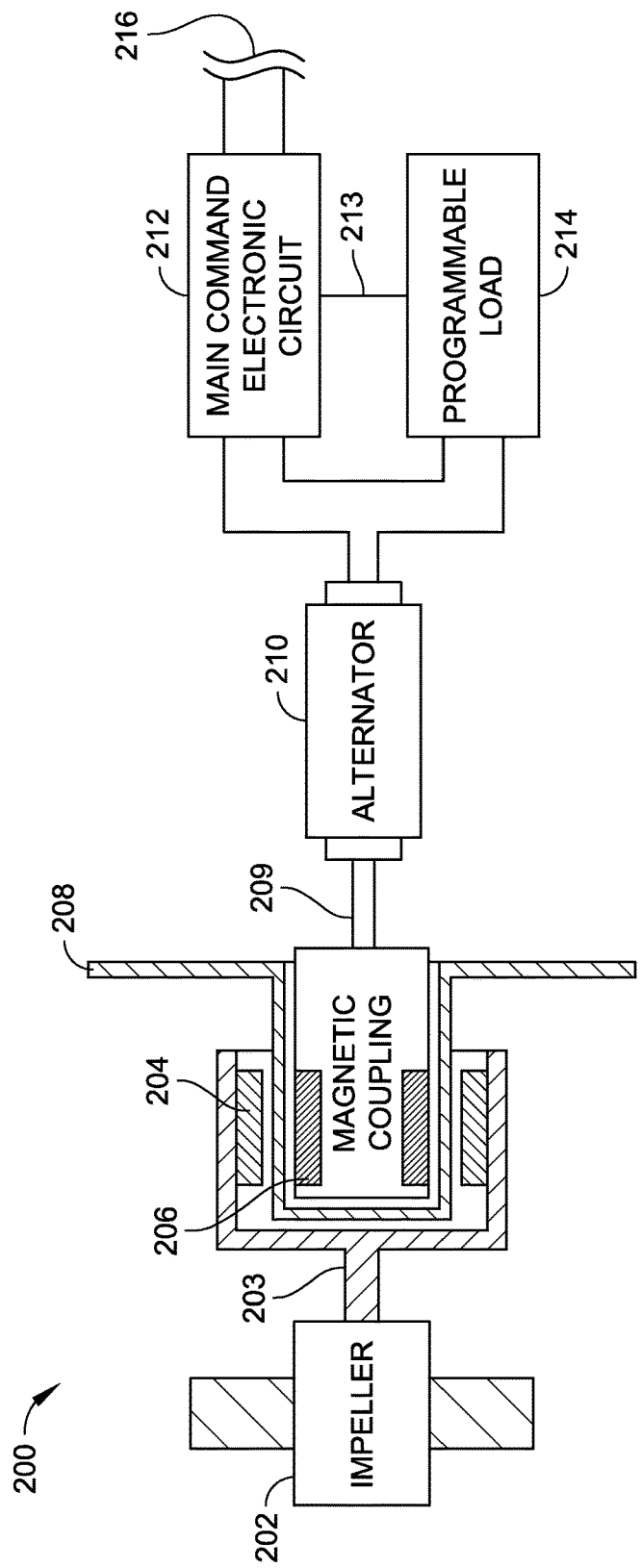
FIG. 2 illustrates an example system in which embodiments of an electrical power generation system can be implemented.

FIG. 2 shows an embodiment of system 200 which can be used to power electronic devices 216 (e.g., sensors, electrical motors, transmitters, receivers, controllers, energy storage devices, and so forth) on the surface or downhole. According to various embodiments of this disclosure, system 200 includes a torque limiting coupling that prevents generator torque (and hence the output voltage) from exceeding a predefined threshold.

In embodiments, the system 200 includes an input shaft 203, which can be a coupled a fluid-driven rotating element 202 (e.g., turbine impeller). The input shaft 203 can therefore be rotationally driven by the flow of the drilling fluid (e.g., mud flowing through or around the turbine impeller 202). For example, drilling fluid (e.g., mud) flowing through or around the drill string 104 can activate a turbine within the drill string 104 (e.g., located in or near the bottom hole assembly 116), thereby causing the turbine impeller or any other fluid-driven rotating element 202 of the turbine to rotate. In some embodiments, the input shaft 203 can form a portion of the fluid-driven rotating element 202. For example, the input shaft 203 can comprise an impeller output shaft. The system 200 further includes an output shaft 209 that is coupled with the input shaft 203 via the torque limiting coupling, such as a magnetic coupling formed by outer magnets 204 coupled to the input shaft 203 and inner magnets 206 coupled to the output shaft 209, or vice versa. The output shaft 209 is rotationally driven by the input shaft 203 to impart a rotational force on an electrical generator 210 (e.g., alternator) in order to generate power for electronic devices 216. In this regard, a torque limiter is implemented between the fluid-driven rotating element 202 and the electrical generator 210. The torque limiter decouples the fluid-driven rotating element 202 from the electrical generator 210 when the torque transmitted from the fluid-driven rotating element 202 to the electrical generator 210 achieves or exceeds the predefined threshold.

In operation, the torque limiting coupling can enter a slipping mode, where magnets 204 and 206 disengage from one another, causing the input shaft 203 to decouple from the output shaft 209. The magnetic coupling can be configured to transmit a predefined (e.g., maximum) torque (T) before sliding or slipping. The predefined torque (T) which can be set or adjusted by selecting component characteristics, such as air gap, magnetic strength, relative dimensions of inner positioned and outer positioned magnets, and so forth. The system 200 can include a main command circuit 212 configured to distribute power from the electrical generator 210 to the electronic device 216 (or multiple devices 216). The main command circuit 212 can be part of an electrical pathway or node that defines a primary load connected to the electrical generator 210. The system 200 can further include a secondary load 214 (e.g., constant load, adjustable or selectable load, electronically programmable load, or the like) that is also connected to the electrical generator 210. The secondary load can maintain a minimum load on the electrical generator 210. Doing so can allow for the production of electrical power at high density and voltage stability substantially independent of fluid flow. In some embodiments, an information link 213 couples the primary and secondary loads 212 and 214, where the information link 213 provides the secondary load 214 with primary load information (e.g., power, impedance, capacitance, and/or inductance characteristics) and enables the secondary load 214 to be adjusted at least partially based on the primary load 212, or vice versa.

In embodiments, the secondary load 214 is a programmable electric load 214 that can be set such that once a desired voltage generation is reached by the electrical generator 210 (e.g., once the alternator reaches a certain RPM), the programmable load 214 can maintain a substantially constant combined load on the electrical generator 210 so that the resistive torque from the electrical generator 210 can be maintained approximately at the predefined (e.g., maximum) torque (T) that the torque limiting coupling is designed to transmit. When the torque limiting coupling begins slipping the torque and alternator shaft RPM can be maintained at any RPM of the fluid-driven rotating element 202. That is, until the fluid-driven rotating element 202 slows down and the coupling returns to transmitting a torque below the predefined torque (T).

In some embodiments, the input shaft 203 is in a first environment and the output shaft 209 is in a second environment different from the first environment. For example, the first and second environments can have different atmospheric characteristics (e.g., different ambient pressures) or different exposure to fluid (e.g., mud), rock cuttings, or the like. The system 200 can include a physical barrier 208 that substantially isolates or separates the first environment from the second environment. The physical barrier 208 can be in the mechanical chain between the fluid-driven rotating element 202 and the electrical generator 210 and can shield system components in the first environment from exposure to mud, rock cuttings, and the like. Where the torque limiting coupling is a magnetic coupling (e.g., inner disposed magnets 206 nestled within outer disposed magnets 204), the physical barrier 208 is enabled to completely seal the output shaft 209 coupled with inner magnets 206 from the first environment that includes the output shaft 203 coupled with outer magnets 204.

Figure 3:
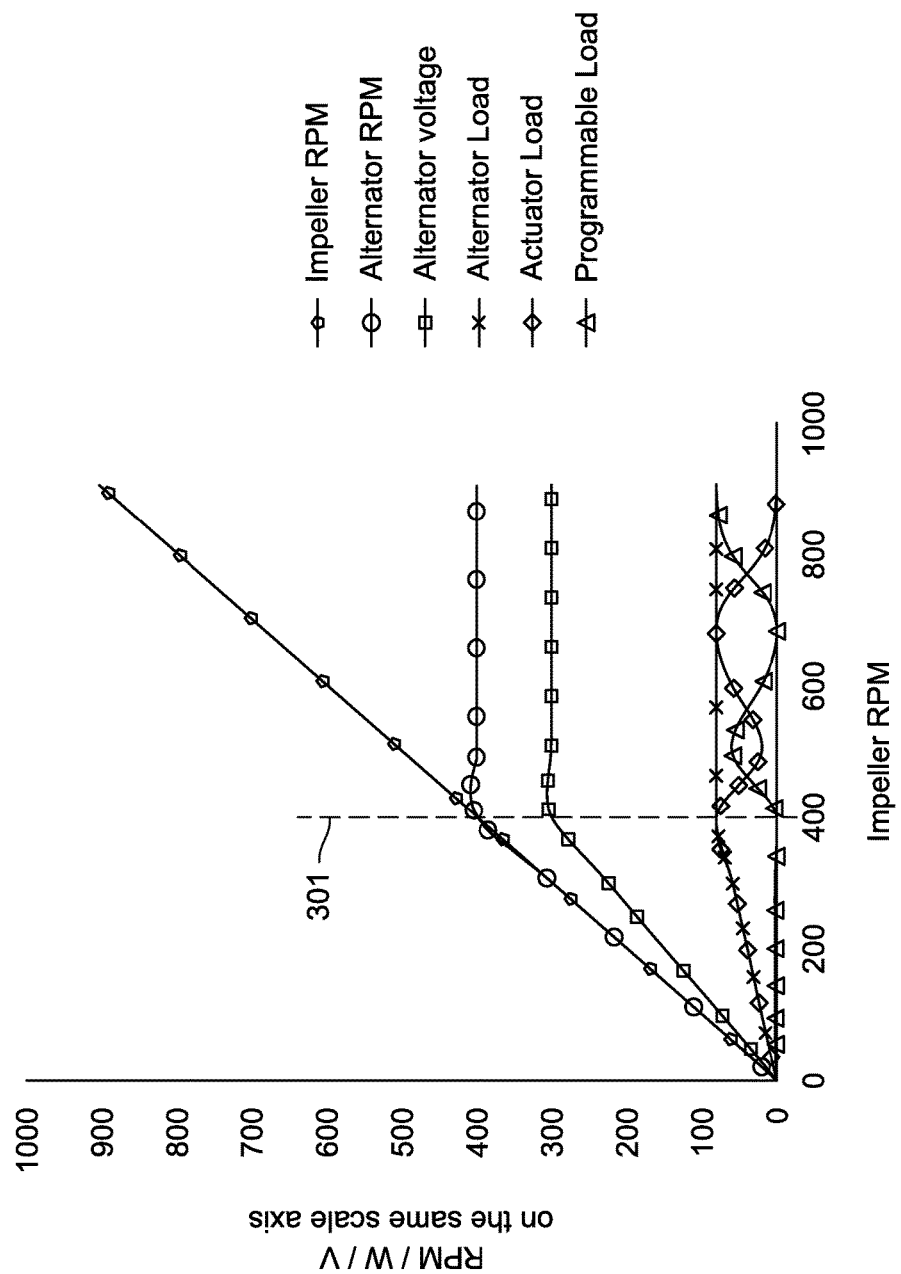
FIG. 3 is a chart that plots revolutions per minute (RPM), Watts (W), and Volts (V) as a function of impeller revolutions per minute (RPM) for an electrical power generation system, such as the example system illustrated in FIG. 2.

FIG. 3 is a graph that illustrates the behavior of the RPM, voltage, and load on each component of a system having a torque limiting coupling, such as system 200. At a predefined torque, voltage, or RPM, such as the example threshold RPM illustrated by line 301 in FIG. 3, impeller torque continues to increase, but the alternator becomes decoupled from the impeller and its load and voltage are maintained at substantially constant predefined values. Dissipated energy is the difference between the desired alternator load (e.g., maximum power at which the actuator is driven) and current load usage. This can be a fraction of the amount of heat that would otherwise be dissipated, e.g., in a configuration where the impeller was fully braked down to an RPM giving the desired voltage. In some embodiments, the heat from the secondary load 214 can be dissipated into the flow of drilling fluid. Alternatively, the secondary load 214 can be used to charge an accumulator and/or heat up internal components of the system (e.g., to maintain oil at a desired temperature for lubrication in a cold environment, and so on).

In embodiments, the secondary load 214 can include or can be coupled with a controller for programming the load on the electrical generator 210. The secondary load 214 can include a memory operable to store program modules and a processor operably coupled to the memory. The processor can be operable to execute the program modules to adjust the electronically programmable load in order to maintain the torque transmitted by the coupling approximately at the predefined torque (T) after the coupling slips. The secondary load can also be a mechanically or electromechanically adjustable load. For example, the secondary load 214 can be set or adjusted by appropriate selection or manipulation of magnetic couplings. In some embodiments, the secondary load 214 can include an electronically driven magnetic coupling. The secondary load 214 can also be an electronically controlled impedance, capacitance, and/or inductance. In some embodiments, the secondary load 214 can be relatively low power. For example, a load that is approximately in the range of 100 W to 300 W can be suitable for downhole equipment such as a Telescope, Digiscope, Sonic Mapping and Caliper (SMAC), High-Pressure High-Temperature (HPHT) Rotary Steering System (RSS), or the like.

As described herein, a system, such as system 200, including some or all of its components, can operate under computer control. For example, a processor can be included with or in a system to control the components and functions of systems described herein using software, firmware, hardware (e.g., fixed logic circuitry), manual processing, or a combination thereof. The terms "controller," "functionality," and "logic" as used herein generally represent software, firmware, hardware, or a combination of software, firmware, or hardware in conjunction with controlling the systems. In the case of a software implementation, the module, functionality, or logic represents program code that performs specified tasks when executed on a processor (e.g., central processing unit (CPU) or CPUs). The program code can be stored in one or more computer-readable memory devices (e.g., internal memory and/or one or more tangible media), and so on. The structures, functions, approaches, and techniques described herein can be implemented on a variety of commercial computing platforms having a variety of processors.

Although only a few example embodiments have been described in detail above, those skilled in the art will readily appreciate that many modifications are possible in the example embodiments without materially departing from electrical power generation systems. Features shown in individual embodiments referred to above may be used together in combinations other than those which have been shown and described specifically. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed is:

1. A system for generating electrical power for down hole electrical devices of a drill string, comprising:
   an input shaft coupled to an impeller of a mud turbine, the input shaft configured to be rotationally driven by fluid flow in association with the impeller;
   an output shaft to be rotationally driven by the input shaft;
   a coupling that couples the input shaft to the output shaft, the coupling configured to transmit a predefined torque before slipping; and
   an electrical generator coupled with the output shaft, wherein the electrical generator is to be electrically connected to a primary electrical load and a secondary electrical load, the secondary electrical load including a variable load that varies based on an output of the electrical generator to maintain a minimum load on the electrical generator such that a torque transmitted by the coupling can be maintained approximately at the predefined torque after the coupling slips.

2. The system as recited in claim 1, wherein the electrical generator comprises an alternator, and wherein the output of the electrical generator includes one or more of a predetermined voltage, a predetermined wattage, or a predetermined rate of rotation of the alternator.

3. The system as recited in claim 1, wherein the input shaft comprises an impeller output shaft.

4. The system as recited in claim 1, wherein the coupling comprises a magnetic coupling.

5. The system as recited in claim 1, wherein the input shaft is in a first environment and the output shaft is in a second environment different from the first environment in atmospheric conditions or exposure to fluid or rock cuttings, the system further including a physical barrier that substantially isolates the first environment from the second environment.

6. The system as recited in claim 1, wherein secondary electrical load comprises an electronically programmable load.

7. The system as recited in claim 1, wherein the secondary electrical load is adjustable within the range of approximately one hundred Watts (100 W) and three hundred Watts (300 W).

8. The system as recited in claim 1, further comprising an accumulator to receive heat generated by the secondary electrical load.

9. A system for generating electrical power for downhole electrical devices of a drill string, comprising:
   an input shaft rotationally driven by a turbine impeller;
   an output shaft to be rotationally driven by the input shaft;
   a magnetic coupling that couples the input shaft to the output shaft, the magnetic coupling configured to transmit a predefined torque before slipping; and
   an alternator coupled with the output shaft, wherein the alternator is to be electrically connected to a primary electrical load and a secondary electrical load, the primary electrical load and secondary electrical load being in data communication via an information link, the secondary electrical load including a variable load that varies based on an output of the alternator to maintain a minimum load on the alternator such that a torque transmitted by the magnetic coupling can be maintained approximately at the predefined torque after the magnetic coupling slips.

10. The system as recited in claim 9, wherein the input shaft is in a first environment and the output shaft is in a second environment different from the first environment, the system further including a physical barrier that substantially isolates the first environment from the second environment.

11. The system as recited in claim 10, wherein the physical barrier is in a mechanical chain between the output shaft and the alternator.

12. The system as recited in claim 9, wherein the secondary electrical load is adjustable within the range of approximately one hundred Watts (100 W) and three hundred Watts (300 W).

13. The system as recited in claim 9, further comprising an accumulator to receive heat generated by the secondary electrical load.

14. A system for generating electrical power for downhole electrical devices of a drill string, comprising:
    a rotatable input shaft;
    an output shaft to be rotationally driven by the rotatable input shaft;
    a magnetic coupling that couples the rotatable input shaft to the output shaft, the magnetic coupling configured to transmit a predefined torque before slipping;
    an electrical generator coupled with the output shaft, wherein the electrical generator is to be electrically connected to a primary electrical load and an electronically programmable load;
    a memory operable to store one or more modules; and
    a processor operably coupled to the memory, the processor operable to execute the one or more modules to adjust the electronically programmable load to maintain a minimum load on the electrical generator such that a torque transmitted by the magnetic coupling can be maintained approximately at the predefined torque after the magnetic coupling slips.

15. The system as recited in claim 14, wherein the rotatable input shaft is in a first environment and the output shaft is in a second environment different from the first environment, the system further including a physical barrier that substantially isolates the first environment from the second environment.

16. The system as recited in claim 15, wherein the second environment different from the first environment in atmospheric conditions or exposure to fluid or rock cuttings.

17. The system as recited in claim 16, wherein the physical barrier is configured to completely seal the output shaft coupled with inner magnets from the first environment that includes the output shaft coupled with outer magnets.

18. The system as recited in claim 17, wherein the rotatable input shaft comprises an impeller output shaft.

19. The system as recited in claim 18, wherein the electronically programmable load is adjustable within the range of approximately one hundred Watts (100 W) and three hundred Watts (300 W).

20. The system as recited in claim 19, wherein the electronically programmable load includes an electronically driven magnetic coupling.

\* \* \* \* \*